US012227003B2

(12) United States Patent
Shinoto et al.

(10) Patent No.: US 12,227,003 B2
(45) Date of Patent: Feb. 18, 2025

(54) LIQUID DISCHARGE APPARATUS AND METHOD FOR CONTROLLING LIQUID DISCHARGE APPARATUS

(71) Applicant: SEIKO EPSON CORPORATION, Tokyo (JP)

(72) Inventors: Akira Shinoto, Matsumoto (JP); Ken Inoue, Shiojiri (JP); Ryota Takahashi, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 161 days.

(21) Appl. No.: 18/187,287

(22) Filed: Mar. 21, 2023

(65) Prior Publication Data

US 2023/0321974 A1 Oct. 12, 2023

(30) Foreign Application Priority Data

Mar. 22, 2022 (JP) ................................. 2022-045500

(51) Int. Cl.
*B41J 2/04* (2006.01)
*B41J 2/045* (2006.01)
*B41J 2/14* (2006.01)
*B41J 29/393* (2006.01)

(52) U.S. Cl.
CPC ............... *B41J 2/0455* (2013.01); *B41J 2/14* (2013.01); *B41J 29/393* (2013.01)

(58) Field of Classification Search
CPC . B41J 2/0455; B41J 2/14; B41J 29/393; B41J 2/04581; B41J 2/04586; B41J 2/04526; B41J 2/04556; B41J 2/04558; B41J 2/0456; B41J 2/04578; B41J 2/04501; B41J 2/04503; B41J 2/04505; B41J 2/04508
See application file for complete search history.

(56) References Cited

U.S. PATENT DOCUMENTS

2017/0087867 A1 3/2017 Sato et al.
2018/0345677 A1* 12/2018 Udagawa ............ B41J 2/16535
2021/0146689 A1 5/2021 Matsuoka
2021/0206170 A1 7/2021 Kobayashi et al.

FOREIGN PATENT DOCUMENTS

JP 2010120263 * 6/2010 ............. B41J 2/175
JP 2011245869 * 12/2011 ............. B41J 2/175
JP 2017-061091 A 3/2017
JP 2020-104271 A 7/2020
JP 2021-079553 A 5/2021
JP 2021-109331 A 8/2021

* cited by examiner

*Primary Examiner* — Kristal Feggins
(74) *Attorney, Agent, or Firm* — WORKMAN NYDEGGER

(57) ABSTRACT

A liquid discharge apparatus includes a liquid discharge head, a supply path that supplies a liquid from a liquid supply source to the liquid discharge head, a pump configured to suck and exhaust air, an air suction path in communication with an air suction side of the pump, an air exhaust path in communication with an air exhaust side of the pump, a first storage portion having a portion formed of a flexible wall that is flexible, a first air chamber provided on a side opposite to the first storage portion across the flexible wall and having at least a portion facing the flexible wall and configured to be displaced, and a first switching portion configured to switch a path coupled to the first air chamber between the air suction path and the air exhaust path.

9 Claims, 4 Drawing Sheets

LIQUID DISCHARGE APPARATUS AND METHOD FOR CONTROLLING LIQUID DISCHARGE APPARATUS

The present application is based on, and claims priority from JP Application Serial Number 2022-045500, filed Mar. 22, 2022, the disclosure of which is hereby incorporated by reference herein in its entirety.

BACKGROUND

1. Technical Field

The present disclosure relates to a liquid discharge apparatus such as a printer and a method for controlling the liquid discharge apparatus.

2. Related Art

For example, as described in JP-A-2017-061091, there is a liquid ejecting apparatus that performs printing by ejecting a liquid from a liquid ejecting portion, which is an example of a liquid discharge head. The liquid ejecting apparatus includes a liquid accommodation portion, which is an example of a first storage portion, an expansion and contraction portion, which is an example of a first air chamber, a pressure pump, and a fluid pressure regulator.

The liquid accommodation portion has a wall surface, a part of which is configured with a diaphragm portion, which is an example of a flexible wall. The pressure pump expands the expansion and contraction portion by pressurizing a fluid, which is an example of air, and supplying the fluid to the expansion and contraction portion. The expansion and contraction portion that has expanded presses the diaphragm portion in such a direction that the volume of the liquid accommodation portion is reduced. The fluid pressure regulator releases the pressurization by letting the fluid escape. The expansion and contraction portion in which the pressurization is released contracts and releases the pressing of the diaphragm portion.

In some cases, the first air chamber is not easily deformed due to an influence such as wrinkles. Therefore, the first air chamber does not sufficiently contract only by letting air escape from the first air chamber, and the pressurization of the first air chamber may be insufficiently released.

SUMMARY

The present disclosure is a liquid discharge apparatus including a liquid discharge head that is configured to discharge a liquid from a nozzle, a supply path that supplies the liquid from a liquid supply source accommodating the liquid to the liquid discharge head, a pump that is configured to suck and exhaust air, an air suction path that is in communication with an air suction side of the pump, an air exhaust path that is in communication with an air exhaust side of the pump, a first storage portion that is provided in the supply path and has a portion formed of a flexible wall that is flexible, a first air chamber that is provided on a side opposite to the first storage portion across the flexible wall and in which at least a portion facing the flexible wall is configured to be displaced, and a first switching portion that is configured to switch a path coupled to the first air chamber between the air suction path and the air exhaust path, in which the flexible wall is displaced by displacement of the first air chamber caused by air suction from the first air chamber to which the air suction path is coupled and air exhaust to the first air chamber to which the air exhaust path is coupled.

The present disclosure is a method for controlling a liquid discharge apparatus, the liquid discharge apparatus including a liquid discharge head that is configured to discharge a liquid from a nozzle, a supply path that supplies the liquid from a liquid supply source accommodating the liquid to the liquid discharge head, a pump that is configured to suck and exhaust air, an air suction path that is in communication with an air suction side of the pump, an air exhaust path that is in communication with an air exhaust side of the pump, a first storage portion that is provided in the supply path and has a portion formed of a flexible wall that is flexible, a first air chamber that is provided on a side opposite to the first storage portion across the flexible wall and in which at least a portion facing the flexible wall is configured to be displaced, and a first switching portion that is configured to switch a path coupled to the first air chamber between the air suction path and the air exhaust path, in which the flexible wall is displaced by displacement of the first air chamber caused by air suction from the first air chamber to which the air suction path is coupled and air exhaust to the first air chamber to which the air exhaust path is coupled, the method including coupling the air exhaust path to the first air chamber by the first switching portion, discharging the liquid from the nozzle by displacing the flexible wall in a direction in which a volume of the first storage portion is reduced by exhausting air to the first air chamber to pressurize an inside of the first air chamber, coupling the air suction path to the first air chamber while releasing coupling of the air exhaust path to the first air chamber by the first switching portion, and depressurizing the inside of the first air chamber by sucking air from the first air chamber.

DESCRIPTION OF EXEMPLARY EMBODIMENTS

Embodiment

Figure 1:
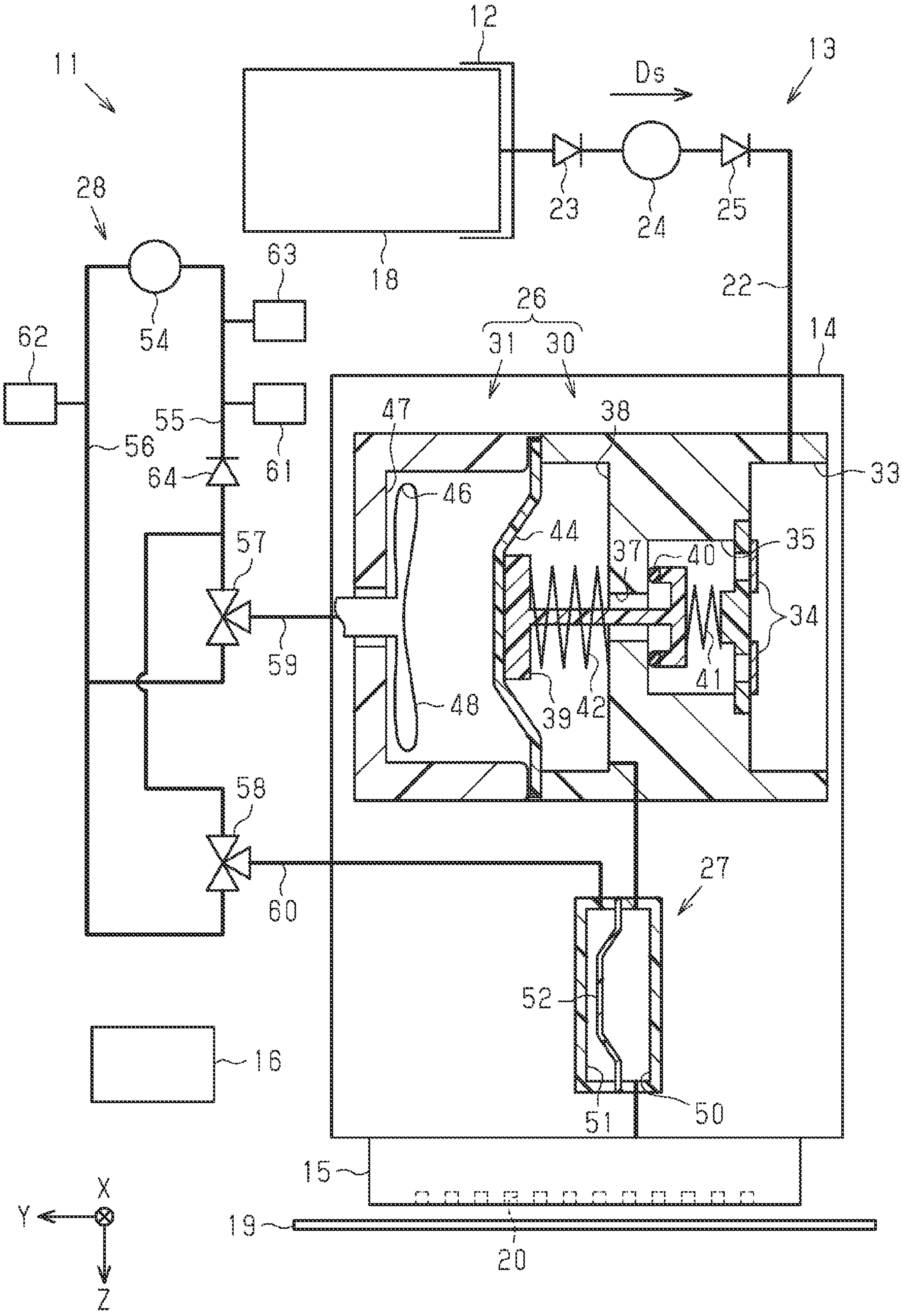
FIG. 1 is a schematic view of a first embodiment of a liquid discharge apparatus.

Hereinafter, a first embodiment of a liquid discharge apparatus and a method for controlling the liquid discharge apparatus will be described with reference to the drawings. The liquid discharge apparatus is, for example, an ink jet printer that performs printing by discharging ink, which is an example of a liquid, to a medium such as a sheet of paper, a fabric, a vinyl sheet, a plastic part, and a metal part.

In the drawings, a Z-axis indicates a gravity direction assuming that a liquid discharge apparatus 11 is placed on a horizontal plane, and an X-axis and a Y-axis indicate directions along the horizontal plane. The X-axis, Y-axis, and Z-axis are orthogonal to each other.

Liquid Discharge Apparatus

As illustrated in FIG. 1, the liquid discharge apparatus 11 may include a mounting portion 12, a supply mechanism 13, a carriage 14, a liquid discharge head 15, and a controller 16.

A liquid supply source 18 that accommodates the liquid may be mounted on the mounting portion 12 so as to be attached or removed. When the liquid can be supplied to the liquid supply source 18, the liquid supply source 18 may be fixed to the mounting portion 12.

The carriage 14 can move in a scanning direction while being mounted with the liquid discharge head 15. The scanning direction extends along a plane of a medium 19 on which printing is performed. The scanning direction may be a direction parallel to the Y-axis. The carriage 14 may reciprocate the liquid discharge head 15 across the medium 19.

The liquid discharge head 15 can discharge the liquid from a nozzle 20. The liquid discharge head 15 performs printing on the medium 19 by discharging the liquid from a plurality of the nozzles 20. The liquid discharge head 15 discharges the liquid supplied by the supply mechanism 13.

Supply Mechanism

The supply mechanism 13 supplies the liquid from the liquid supply source 18 mounted on the mounting portion 12 to the liquid discharge head 15. The supply mechanism 13 includes a supply path 22. The supply mechanism 13 may include a first one-way valve 23, a supply pump 24, a second one-way valve 25, a pressure-regulating mechanism 26, a deaerating mechanism 27, and a drive mechanism 28. The pressure-regulating mechanism 26 and the deaerating mechanism 27 may be provided on the carriage 14.

The upstream end of the supply path 22 may be provided in the mounting portion 12. The upstream end of the supply path 22 may be, for example, a hollow needles stuck into the liquid supply source 18. Since the upstream end of the supply path 22 is coupled to the liquid supply source 18 mounted on the mounting portion 12, the supply path 22 can lead the liquid accommodated in the liquid supply source 18 out.

The downstream end of the supply path 22 is coupled to the liquid discharge head 15. The supply path 22 supplies the liquid from the liquid supply source 18 to the liquid discharge head 15. The supply path 22 couples the liquid supply source 18 to the liquid discharge head 15 such that the liquid can flow therethrough. The supply path 22 is provided with the first one-way valve 23, the supply pump 24, the second one-way valve 25, the pressure-regulating mechanism 26, and the deaerating mechanism 27 in this order from upstream where the liquid supply source 18 is provided.

The first one-way valve 23 is provided upstream of the supply pump 24. The second one-way valve 25 is provided downstream of the supply pump 24. The first one-way valve 23 and the second one-way valve 25 permit the flow of the liquid toward downstream in a supply direction Ds and regulate the flow of the liquid toward upstream.

The supply pump 24 may be provided between the first one-way valve 23 and the second one-way valve 25. The supply pump 24 is, for example, a diaphragm pump. The supply pump 24 leads the liquid out to the supply path 22 by applying a negative pressure to the liquid accommodated in the liquid supply source 18. The supply pump 24 pressurizes and supplies the liquid from the liquid supply source 18 toward the liquid discharge head 15 in the supply direction Ds.

Pressure-Regulating Mechanism

The pressure-regulating mechanism 26 may include a liquid pressure regulator 30 and an open portion 31. The liquid pressure regulator 30 may include an upstream filter chamber 33, a filter 34, and a downstream filter chamber 35. The liquid pressure regulator 30 may include a communication hole 37, a first storage portion 38, a pressure receiving portion 39, a valve body 40, an upstream pressing member 41, and a downstream pressing member 42.

The upstream filter chamber 33 is located upstream of the filter 34. The downstream filter chamber 35 is located downstream of the filter 34. The liquid of the upstream filter chamber 33 passes through the filter 34 and flows into the downstream filter chamber 35.

The filter 34 captures foreign materials in the liquid. As the filter 34, for example, a net-like body, a porous body, or a porous plate on which fine through-holes are formed can be used. The communication hole 37 causes the downstream filter chamber 35 to be in communication with the first storage portion 38. Causing portions to be in communication means coupling the portions such that a fluid such as a liquid and gas can flow therethrough. That is, the communication hole 37 couples the downstream filter chamber 35 to the first storage portion 38 such that the liquid can flow therethrough.

The first storage portion 38 is provided in the supply path 22. The first storage portion 38 temporarily stores the liquid flowing through the supply path 22. The first storage portion 38 may be provided on the carriage 14. A part of the first storage portion 38 is formed of a flexible wall 44 that is flexible. The flexible wall 44 forms a part of a wall surface of the first storage portion 38. The flexible wall 44 is formed of, for example, a diaphragm that can be bent and displaced.

The pressure receiving portion 39 has a base end accommodated in the downstream filter chamber 35 and a tip end accommodated in the first storage portion 38. The valve body 40 can open and close the communication hole 37. The valve body 40 may be an elastic body such as rubber or resin attached to the base end portion of pressure receiving portion 39 located in the downstream filter chamber 35.

The upstream pressing member 41 is accommodated in the downstream filter chamber 35. The upstream pressing member 41 presses the valve body 40 in a direction in which the communication hole 37 is closed through the pressure receiving portion 39. The downstream pressing member 42 is accommodated in the first storage portion 38. The downstream pressing member 42 presses the flexible wall 44 in a direction in which the volume of a second storage portion 50 is increased through the pressure receiving portion 39.

The pressure-regulating mechanism 26 opens the supply path 22 when the pressure in the liquid discharge head 15 goes below a predetermined negative pressure. Specifically, for example, when the liquid is discharged from the nozzle 20 and the pressure in the liquid discharge head 15 decreases, the pressure in the first storage portion 38 also decreases. When a force of the flexible wall 44 to press the pressure receiving portion 39 exceeds the pressing force of the upstream pressing member 41 and the downstream pressing member 42 as the pressure in the first storage portion 38 decreases, the valve body 40 opens the communication hole 37.

When the communication hole 37 is opened and the liquid flows into the first storage portion 38 from the downstream filter chamber 35, the inner pressure of the first storage portion 38 increases. As a result, before the inner pressure of the first storage portion 38 increases and becomes a positive pressure, the valve body 40 closes the communication hole 37 by the pressing force of the upstream pressing member 41 and the downstream pressing member 42. In this manner, the inner pressure of the first storage portion 38 is maintained in a range of a negative pressure according to the pressing force of the upstream pressing member 41 and the downstream pressing member 42.

The inner pressure of the first storage portion 38 decreases as the liquid is discharged from the liquid discharge head 15. The valve body 40 autonomously opens and closes the communication hole 37 according to the differential pressure between atmospheric pressure, which is the outer pressure of the first storage portion 38, and the inner pressure of the first storage portion 38. Therefore, the liquid pressure regulator 30 is a differential pressure valve. The differential pressure valve is also called a depressurizing valve or a self-sealing valve. The liquid pressure regulator 30 regulates the pressure of the liquid to be supplied to the liquid discharge head 15 such that the pressure becomes regulated pressure that makes it possible to discharge the liquid from the nozzle 20. The regulated pressure is, for example, −1 kPa. The regulated pressure is pressure that causes a recessed liquid surface to be formed in the nozzle 20 with respect to a direction in which the liquid is discharged from the nozzle 20. The liquid pressure regulator 30 stabilizes the pressure of the liquid to be supplied to the nozzle 20 by regulating the pressure of the liquid that is pressurized and supplied.

The open portion 31 may include a first air chamber 46 and an accommodation chamber 47. The open portion 31 forcibly opens the communication hole 37 so that the liquid can be pressurized and supplied to the liquid discharge head 15.

The first air chamber 46 may be provided on the carriage 14. The first air chamber 46 is provided on a side opposite to the first storage portion 38 across the flexible wall 44. At least a portion of the first air chamber 46 facing the flexible wall 44 can be displaced. At least a part of the first air chamber 46 may be formed of a flexible member 48 that is flexible. The entire first air chamber 46 of the present embodiment is formed of the flexible member 48. The first air chamber 46 of the present embodiment is formed of the flexible member 48 having a bag-like shape. The entire first air chamber 46 of the present embodiment is flexible. In the first air chamber 46, the flexible member 48 may be configured to come into contact with the flexible wall 44.

The accommodation chamber 47 is separated from the first storage portion 38 by the flexible wall 44. The accommodation chamber 47 accommodates the first air chamber 46. That is, the accommodation chamber 47 accommodates the flexible member 48 that forms the first air chamber 46 such that the flexible member 48 can be displaced.

Deaerating Mechanism

The deaerating mechanism 27 may include the second storage portion 50, a second air chamber 51, and a transmissive portion 52.

The second storage portion 50 is provided in the supply path 22. A part of the second storage portion 50 may be formed of the transmissive portion 52. The second storage portion 50 may be provided on the carriage 14. The second air chamber 51 is provided on a side opposite to the second storage portion 50 the transmissive portion 52. The second air chamber 51 may be provided on the carriage 14.

The transmissive portion 52 separates the second storage portion 50 from the second air chamber 51. The transmissive portion 52 may have gas transmissivity. At least a part of the transmissive portion 52 may be flexible. The transmissive portion 52 of the present embodiment is formed of a film whose entire portion is flexible.

Drive Mechanism

The drive mechanism 28 includes a pump 54, an air suction path 55, an air exhaust path 56, and a first switching portion 57. The drive mechanism 28 may include a second switching portion 58, a first coupling path 59, a second coupling path 60, a first pressure regulator 61, a second pressure regulator 62, a detector 63, and a third one-way valve 64.

The pump 54 can suck and exhaust air. The pump 54 of the present embodiment is an air pump. The pump 54 may be, for example, a diaphragm pump or a tube pump.

The air suction path 55 is in communication with the air suction side of the pump 54. The air suction path 55 causes the pump 54 to be in communication with the first switching portion 57. The air suction path 55 may cause the pump 54 to be in communication with the first switching portion 57 and the second switching portion 58. In the air suction path 55 of the present embodiment, the upstream is branched and coupled to the first switching portion 57 and the second switching portion 58, and the downstream end is coupled to the pump 54.

The air exhaust path 56 is in communication with the air exhaust side of the pump 54. The air exhaust path 56 causes the pump 54 to be in communication with the first switching portion 57. The air exhaust path 56 may cause the pump 54 to be in communication with the first switching portion 57 and the second switching portion 58. In the air exhaust path 56 of the present embodiment, the upstream end is coupled to the pump 54, and the downstream end is branched and coupled to the first switching portion 57 and the second switching portion 58.

The first switching portion 57 can switch a path coupled to the first air chamber 46 between the air suction path 55 and the air exhaust path 56. The second switching portion 58 can switch a path coupled to the second air chamber 51 between the air suction path 55 and the air exhaust path 56. That is, the air suction path 55 can be coupled to the first air chamber 46 and the second air chamber 51. The air exhaust path 56 can be coupled to the first air chamber 46 and the second air chamber 51. The first switching portion 57 and the second switching portion 58 may be a three-way valve.

The first coupling path 59 may couple the first switching portion 57 to the first air chamber 46. The second coupling path 60 may couple the second switching portion 58 to the second air chamber 51. The first pressure regulator 61 is provided in the air suction path 55. The first pressure regulator 61 can maintain the pressure in the air suction path 55 at a predetermined negative pressure. The first pressure regulator 61 may be a regulator that opens a valve when the negative pressure in the air suction path 55 becomes larger than the predetermined negative pressure so as to take air into the air suction path 55. The predetermined negative pressure may be a pressure sufficient to displace the flexible member 48 so that the volume of the first air chamber 46 decreases. The predetermined negative pressure may be a negative pressure larger than a regulated pressure regulated by the liquid pressure regulator 30. The predetermined negative pressure may be a pressure under which gas can move from the second storage portion 50 to the second air chamber 51 through the transmissive portion 52.

The second pressure regulator 62 is provided in the air exhaust path 56. The second pressure regulator 62 can maintain the pressure in the air exhaust path 56 at a predetermined positive pressure. The second pressure regulator 62 may be a regulator that opens a valve when the positive pressure in the air exhaust path 56 becomes larger than the predetermined positive pressure so as to let air in the air exhaust path 56 escape. The predetermined positive pressure may be a pressure that can displace the flexible wall 44 so as to reduce the volume of the first storage portion 38, as the flexible member 48, which is displaced so as to increase the volume of the first air chamber 46, presses the flexible wall 44. The predetermined positive pressure may be a pressure larger than a pressure under which the supply pump 24 supplies the liquid.

The detector 63 may be provided in the air suction path 55. The detector 63 may detect the pressure in the air suction path 55. The third one-way valve 64 may be provided in the air suction path 55. The third one-way valve 64 may be provided between the first pressure regulator 61 and the first switching portion 57. The third one-way valve 64 may be provided between the first pressure regulator 61 and the second switching portion 58. The third one-way valve 64 of the present embodiment is provided between the branching point of the air suction path 55 that is branched and the first pressure regulator 61.

The third one-way valve 64 permits the flow of air from the first air chamber 46 and the second air chamber 51 toward the pump 54 and regulates the flow of air from the pump 54 to the first air chamber 46 and the second air chamber 51. By providing the third one-way valve 64, even when air flows from the first pressure regulator 61 into the air suction path 55, the inside of the first air chamber 46 and the second air chamber 51 can be maintained at a predetermined negative pressure.

The controller 16 integrally controls the driving of each mechanism in the liquid discharge apparatus 11 and controls various operations executed in the liquid discharge apparatus 11. The controller 16 can be configured as a circuit including α: one or more processors that execute various kinds of processing according to a computer program, β: one or more dedicated hardware circuits for executing processing of at least a part of the various kinds of processing, or γ: a combination of α and β. The hardware circuit is, for example an application specific integrated circuit. The processor includes a central processing unit (CPU) and a memory such as a random access memory (RAM) and a read only memory (ROM), and the memory stores a program code or a command configured to be processed by the CPU. The memory, that is, a computer-readable medium includes any kinds of readable medium accessible by a general-purpose or dedicated computer.

Initial Filling

Initial filling refers to filling, with the liquid, the supply path 22 and the liquid discharge head 15 that are filled with air.

A method for controlling the liquid discharge apparatus 11 includes coupling the air exhaust path 56 to the first air chamber 46 by the first switching portion 57. The method for controlling the liquid discharge apparatus 11 may include coupling the air exhaust path 56 to the second air chamber 51 by the second switching portion 58. The controller 16 controls the first switching portion 57 and the second switching portion 58 so as to couple the first air chamber 46 and the second air chamber 51 to the air exhaust path 56. Specifically, the first switching portion 57 couples the air exhaust path 56 to the first coupling path 59 so as to couple the air exhaust path 56 to the first air chamber 46 through the first coupling path 59. The second switching portion 58 couples the air exhaust path 56 to the second coupling path 60 so as to couple the air exhaust path 56 to the second air chamber 51 through the second coupling path 60.

The controller 16 drives the pump 54. The pump 54 sucks air from the air suction path 55 and exhausts air to the air exhaust path 56. Since the upstream end of the air suction path 55 is closed by the first switching portion 57 and the second switching portion 58, air flows into the air suction path 55 from the first pressure regulator 61. Since the air exhaust path 56 is coupled to the first air chamber 46 and the second air chamber 51, the air exhausted by the pump 54 flows into the first air chamber 46 and the second air chamber 51. The first air chamber 46 and the second air chamber 51 are pressurized.

Figure 2:
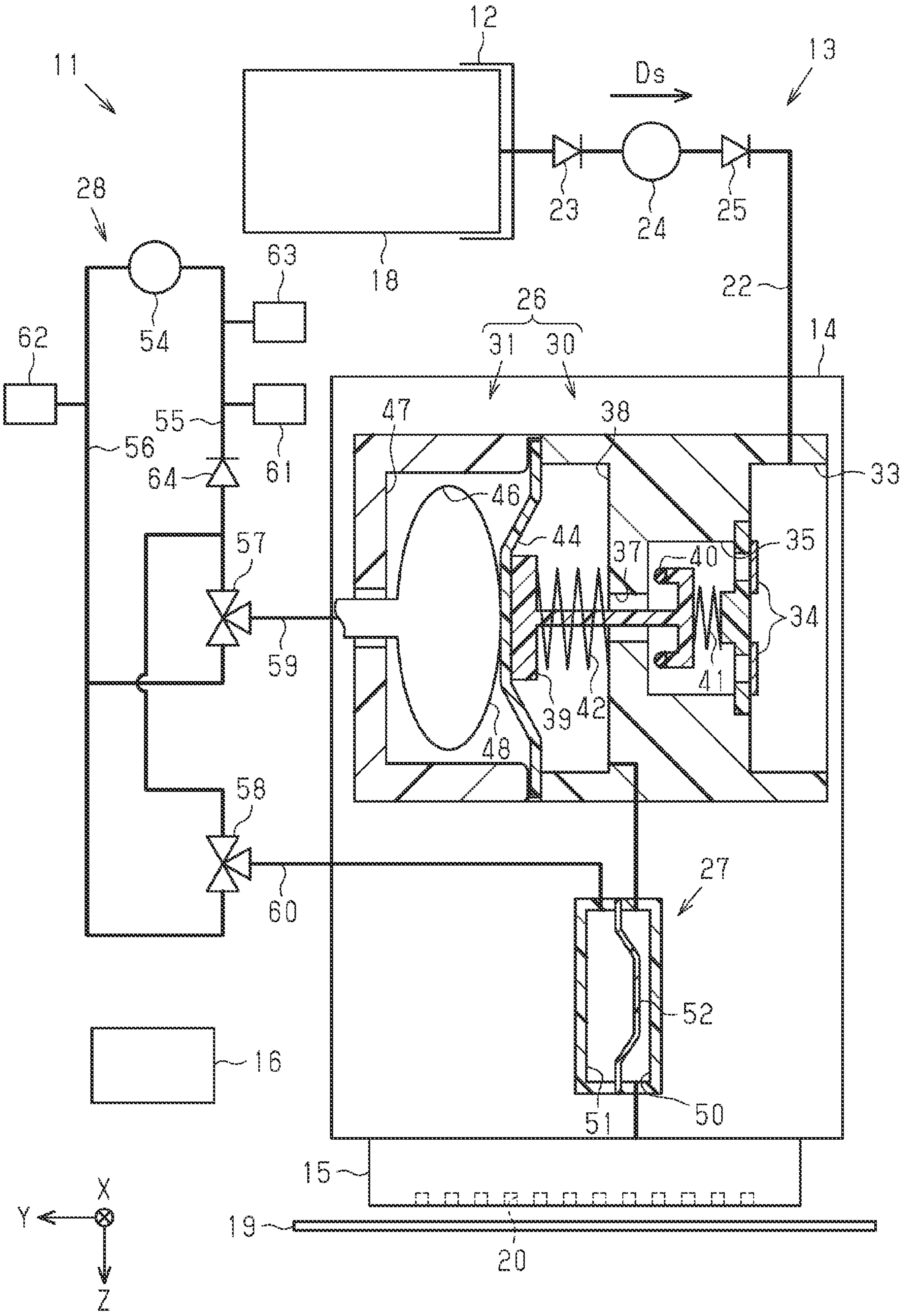
FIG. 2 is a schematic view of the liquid discharge apparatus in which a first air chamber and a second air chamber are pressurized.

As illustrated in FIG. 2, the method for controlling the liquid discharge apparatus 11 includes discharging the liquid from the nozzle 20 by displacing the flexible wall 44 in a direction in which the volume of the first storage portion 38 is reduced by exhausting air to the first air chamber 46 to pressurize the inside of the first air chamber 46. The pressurized first air chamber 46 expands. That is, the flexible member 48 forcibly opens the communication hole 37 by bending and displacing the flexible wall 44 in a direction in which the volume of the first storage portion 38 is reduced. While the communication hole 37 is open, the controller 16 drives the supply pump 24. As the supply pump 24 is driven while the communication hole 37 is open, the supply pump 24 pressurizes and supplies the liquid from the liquid supply source 18 to the liquid discharge head 15.

The method for controlling the liquid discharge apparatus 11 may include displacing a flexible portion of the transmissive portion 52 in a direction in which the volume of the inside of the second storage portion 50 is reduced by discharging air into the second air chamber 51 to pressurize the inside of the second air chamber 51. The pressurized second air chamber 51 displaces the transmissive portion 52 so as to reduce the volume of the second storage portion 50. The flow velocity of the liquid flowing through the second storage portion 50 is faster when the volume of the second storage portion 50 is small than when the volume is large. Therefore, by filling the second storage portion 50 with the liquid in a state in which the volume of second storage portion 50 is reduced, the air remaining in the second storage portion 50 can be reduced.

The method for controlling the liquid discharge apparatus 11 may include filling the supply path 22 with the liquid. The controller 16 pressurizes the first air chamber 46 and the second air chamber 51 and waits while driving the supply pump 24. When the supply path 22 and the liquid discharge head 15 are filled with the liquid, the controller 16 stops driving the supply pump 24.

The method for controlling the liquid discharge apparatus 11 includes coupling the air suction path 55 to the first air chamber 46 while releasing coupling of the air exhaust path 56 to the first air chamber 46 by the first switching portion 57. The method for controlling the liquid discharge apparatus 11 may include coupling the air suction path 55 to the second air chamber 51 while releasing coupling of the air exhaust path 56 to the second air chamber 51 by the second switching portion 58. The controller 16 controls the first switching portion 57 and the second switching portion 58 so as to couple the air suction path 55 to the first air chamber 46 and the second air chamber 51 while releasing the coupling of the air exhaust path 56 to the first air chamber 46 and the second air chamber 51.

The method for controlling the liquid discharge apparatus 11 includes depressurizing the inside of the first air chamber 46 by sucking air from the first air chamber 46. The method for controlling the liquid discharge apparatus 11 may include depressurizing the inside of the second air chamber 51 by sucking air from the second air chamber 51. After the first air chamber 46 and the second air chamber 51 are coupled to the air suction path 55, the pump 54 sucks air inside the first air chamber 46 and the second air chamber 51. The sucked air is exhausted from the second pressure regulator 62.

As illustrated in FIG. 1, the first air chamber 46 from which air is sucked contracts. That is, the flexible member 48 is separated from the flexible wall 44. The flexible wall 44 is pressed by the upstream pressing member 41 and the downstream pressing member 42 through the pressure receiving portion 39, so as to be displaced in a direction in which the volume of the first storage portion 38 is increased. The valve body 40 that moves together with the pressure receiving portion 39 closes the communication hole 37.

In the second air chamber 51 from which air is sucked, the transmissive portion 52 is displaced in a direction in which the volume of the second air chamber 51 is reduced. By making the pressure inside the second air chamber 51 lower than the pressure inside the second storage portion 50, the air remaining in the second storage portion 50 and the air dissolved in the liquid can be easily moved to the second air chamber 51.

After the initial filling is finished, the controller 16 stops driving the supply pump 24 and the pump 54. The air suction path 55 is coupled to the first air chamber 46 and the second air chamber 51, and the third one-way valve 64 regulates the inflow of air from the air suction path 55. Therefore, the inside of the first air chamber 46 and the second air chamber 51 is maintained in a state in which the pressure is reduced.

Printing and Standby

During a printing period in which the liquid is discharged from the nozzle 20 toward the medium 19, the controller 16 drives the supply pump 24. During a standby period in which the liquid is not discharged from the nozzle 20, the controller 16 may stop driving the supply pump 24.

As illustrated in FIG. 1, during the printing or standby period, the controller 16 may stop driving the pump 54 or may periodically drive the pump 54. The first air chamber 46 and the second air chamber 51 are coupled to the air suction path 55. The controller 16 may depressurize the first air chamber 46 and the second air chamber 51 by driving the pump 54 based on the detection results of the detector 63. For example, the controller 16 may drive the pump 54 when air moves from the second storage portion 50 to the second air chamber 51 and the pressure of the second air chamber 51 increases.

Pressurizing Cleaning

Pressurizing cleaning is performed by discharging the liquid from the nozzle 20 as the pressurized liquid is supplied to the liquid discharge head 15.

The method for controlling the liquid discharge apparatus 11 includes coupling the air exhaust path 56 to the first air chamber 46 by the first switching portion 57. The method for controlling the liquid discharge apparatus 11 may include coupling the air suction path 55 to the second air chamber 51 by the second switching portion 58. The controller 16 controls the first switching portion 57 so as to couple the first air chamber 46 to the air exhaust path 56. The controller 16 controls the second switching portion 58 so as to couple the second air chamber 51 to the air suction path 55.

Figure 3:
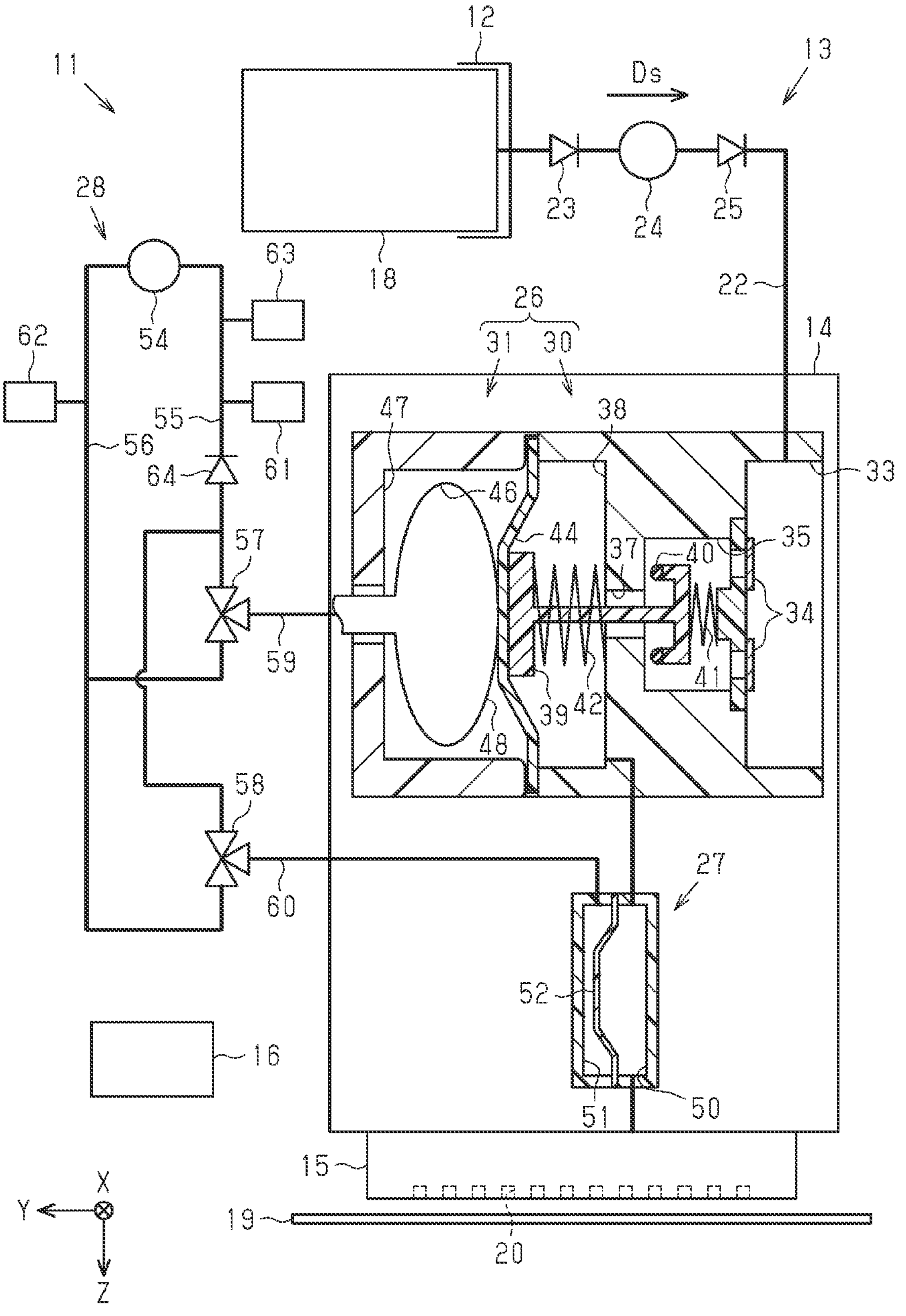
FIG. 3 is a schematic view of the liquid discharge apparatus in which the first air chamber is pressurized.

As illustrated in FIG. 3, the controller 16 drives the pump 54. The pump 54 sucks air from the second air chamber 51 through the air suction path 55 and causes air to flow into the first air chamber 46 through the air exhaust path 56.

The method for controlling the liquid discharge apparatus 11 includes discharging the liquid from the nozzle 20 by displacing the flexible wall 44 in a direction in which the volume of the first storage portion 38 is reduced by exhausting air to the first air chamber 46 to pressurize the inside of the first air chamber 46. The pressurized first air chamber 46 expands. That is, the flexible member 48 bends and displaces the flexible wall 44 in a direction in which the volume of the first storage portion 38 is reduced so as to forcibly open the communication hole 37. The amount of the liquid of the volume decrease in the first storage portion 38 is discharged from the nozzle 20.

While the communication hole 37 is open, the controller 16 drives the supply pump 24. As the supply pump 24 is driven while the communication hole 37 is open, the supply pump 24 discharges the pressurized liquid from the nozzle 20.

The method for controlling the liquid discharge apparatus 11 may include depressurizing the inside of the second air chamber 51 by sucking air from the second air chamber 51. The air suction path 55 is coupled to the second air chamber 51. Therefore, the second air chamber 51 is maintained in a depressurized state. After the liquid is sufficiently discharged from the nozzle 20, the controller 16 stops driving the supply pump 24.

The method for controlling the liquid discharge apparatus 11 includes coupling the air suction path 55 to the first air chamber 46 while releasing the coupling of the air exhaust path 56 to the first air chamber 46 by the first switching portion 57. The controller 16 controls the first switching portion 57 to couple the first air chamber 46 to the air suction path 55. The second air chamber 51 is coupled to the air suction path 55.

The method for controlling the liquid discharge apparatus 11 includes depressurizing the inside of the first air chamber 46 by sucking air from the first air chamber 46. The method for controlling the liquid discharge apparatus 11 may include depressurizing the inside of the second air chamber 51 by sucking air from the second air chamber 51. After the first air chamber 46 and the second air chamber 51 are coupled to the air suction path 55, the pump 54 sucks air inside the first air chamber 46 and the second air chamber 51. The sucked air is exhausted from the second pressure regulator 62.

As illustrated in FIG. 1, the first air chamber 46 from which air is sucked contracts. That is, the flexible member 48 is separated from the flexible wall 44. The flexible wall 44 is pressed by the upstream pressing member 41 and the downstream pressing member 42 through the pressure receiving portion 39 so as to be displaced in a direction in which the volume of the first storage portion 38 is increased. The valve body 40 that moves together with the pressure receiving portion 39 closes the communication hole 37. In the second air chamber 51, a state in which the transmissive portion 52 is displaced in a direction in which the volume of the second air chamber 51 is reduced is maintained. After the pressurizing cleaning is finished, the controller 16 stops driving the pump 54.

Functions of Embodiment

The functions of the present embodiment will be described. The pump 54 sucks air from the first air chamber 46 to which the air suction path 55 is coupled. The pump 54 exhausts air to the first air chamber 46 to which the air exhaust path 56 is coupled. The first air chamber 46 is displaced as the pump 54 sucks air and exhausts air. The flexible wall 44 is displaced by the displacement of the first air chamber 46, In the present embodiment, the flexible member 48 is displaced as the pump 54 sucks air from the first air chamber 46 and exhausts air to the first air chamber 46. The flexible wall 44 is displaced by the displacement of the flexible member 48.

Effects of Embodiment

The effects of the present embodiment will be described.

(1) The first switching portion 57 couples the air suction path 55 or the air exhaust path 56 to the first air chamber 46. The air exhausted by the pump 54 flows into the first air chamber 46 to which the air exhaust path 56 is coupled. Air is sucked out from the first air chamber 46 to which the air suction path 55 is coupled as the pump 54 sucks air. Therefore, insufficient release of pressurization of the first air chamber 46 can be suppressed.

(2) The flexible member 48 can come into contact with the flexible wall 44. The displaced flexible member 48 comes into contact with the flexible wall 44 so as to displace the flexible wall 44. Therefore, compared to a case in which the flexible wall 44 is directly pressurized and depressurized, damage received by the flexible wall 44 can be reduced.

(3) By providing the first pressure regulator 61 in the air suction path 55, the pressure inside the air suction path 55 can be easily maintained at a suitable pressure. By providing the second pressure regulator 62 in the air exhaust path 56, the pressure inside the air exhaust path 56 can be easily maintained at a suitable pressure.

(4) The air suction path 55 can be coupled to the second air chamber 51. Therefore, the pump 54 can depressurize the inside of the second air chamber 51 by sucking air in the second air chamber 51. The second air chamber 51 is partitioned from the second storage portion 50 by the transmissive portion 52 having gas transmissivity. Therefore, by depressurizing the inside of the second air chamber 51, bubbles in the second storage portion 50 can be moved to the second air chamber 51.

(5) The second switching portion 58 couples the air suction path 55 or the air exhaust path 56 to the second air chamber 51. The pump 54 pressurizes the second air chamber 51 by causing the exhausted air to flow into the second air chamber 51 to which the air exhaust path 56 is coupled. Since at least a part of the transmissive portion 52 is flexible, the transmissive portion 52 is displaced in a direction in which the volume of the second air chamber 51 is increased as the second air chamber 51 is pressurized. In other words, the transmissive portion 52 is displaced in a direction in which the volume of the second storage portion 50 is reduced. Therefore, for example, when the second storage portion 50 is filled with the liquid, the second air chamber 51 is pressurized so that air is unlikely to remain in the second storage portion 50.

(6) The first storage portion 38 and the first air chamber 46 are provided on the carriage 14 mounted with the liquid discharge head 15. Therefore, the first storage portion 38 and the first air chamber 46 can be provided at positions near the liquid discharge head 15.

(7) The first storage portion 38, the second storage portion 50, the first air chamber 46, and the second air chamber 51 are provided on the carriage 14. Therefore, the first storage portion 38, the second storage portion 50, the first air chamber 46, and the second air chamber 51 can be provided at positions near the liquid discharge head 15.

Modifications

The present embodiment can be modified and implemented as follows. The present embodiment and the following modifications can be combined with each other and implemented within a range in which the embodiment and modifications do not technically contradict each other.

Figure 4:
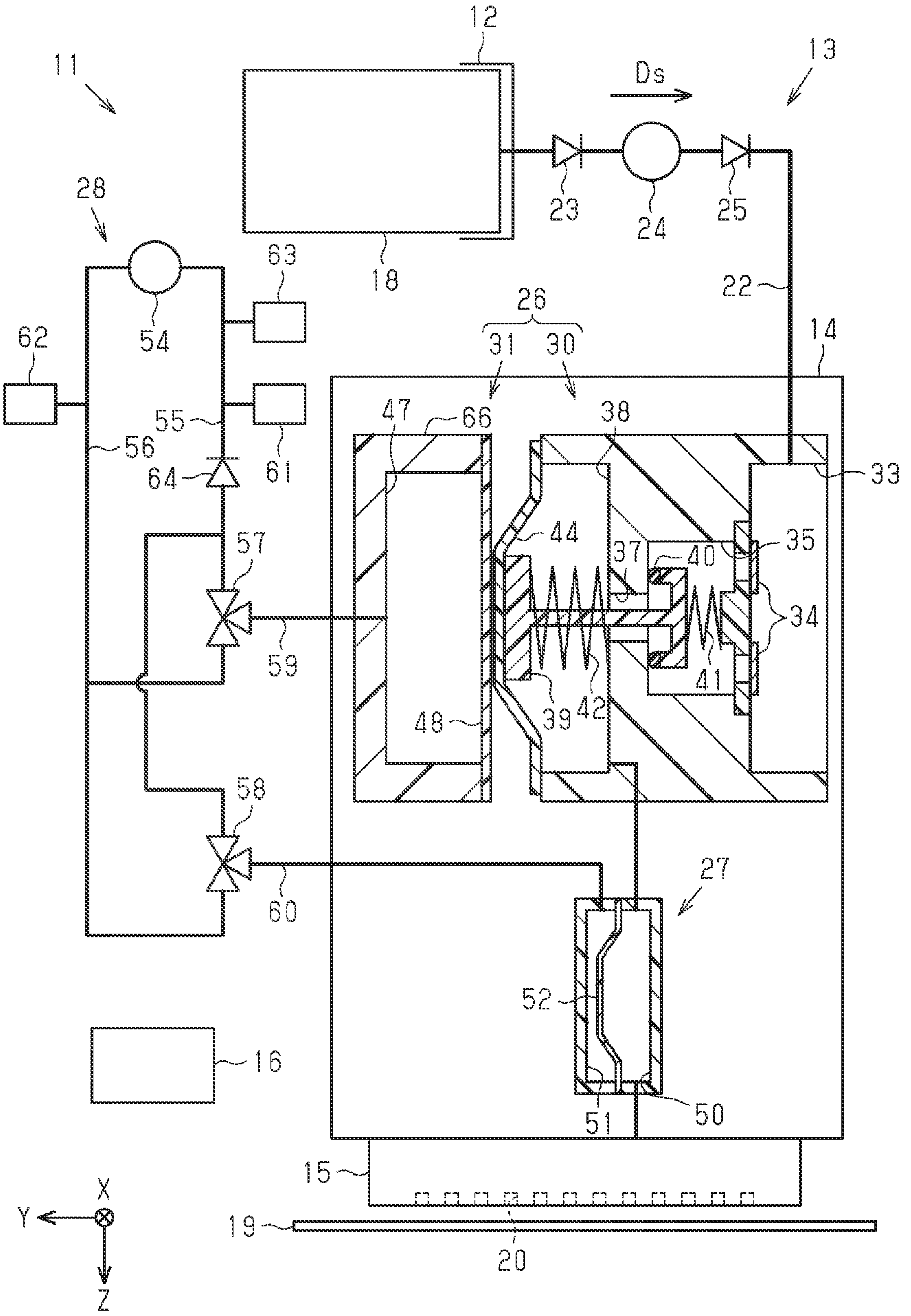
FIG. 4 is a schematic view of a modification of the liquid discharge apparatus.

As illustrated in FIG. 4, a part of the first air chamber 46 may be formed of the flexible member 48 that is flexible. The first air chamber 46 may be configured with a hard case 66 and the flexible member 48. The flexible member 48 may form the first air chamber 46 by closing an opening of the case 66. The open portion 31 may be disposed such that the flexible member 48 faces or comes into contact with the flexible wall 44. The flexible member 48, which is a part of the first air chamber 46, may be displaced as the pump 54 sucks air from the first air chamber 46 and exhausts air to the first air chamber 46.

The liquid discharge apparatus 11 may include a plurality of the supply mechanisms 13. Each of the plurality of supply mechanisms 13 may supply a different kind of liquid. The different kind of liquid refers to, for example, ink of a different color. The liquid discharge head 15 may perform color printing onto the medium 19 by discharging a plurality of kinds of liquid. The liquid discharge apparatus 11 may include the plurality of supply mechanisms 13 and the same number of the drive mechanisms 28 as the number of the supply mechanisms 13. Each drive mechanism 28 may be individually coupled to each supply mechanism 13. The liquid discharge apparatus 11 may include a plurality of the supply mechanisms 13 and the drive mechanisms 28 whose number is less than the number of the supply mechanisms 13. One drive mechanism 28 may be coupled to the plurality of supply mechanisms 13. The drive mechanism 28 may include a plurality of the first switching portions 57 and a plurality of the first coupling paths 59. Each of the plurality of first coupling paths 59 may be coupled to the first air chamber 46 included in each of the plurality of supply mechanisms 13. The drive mechanism 28 may include a plurality of the second switching portions 58 and a plurality of the second coupling paths 60. Each of the plurality of second coupling paths 60 may be coupled to the second air chamber 51 included in each of the plurality of supply mechanisms 13. The drive mechanism 28 may pressurize or depressurize a plurality of the first air chambers 46. The drive mechanism 28 may pressurize or depressurize a plurality of the second air chambers 51.

When the liquid discharge apparatus 11 includes the plurality of first air chambers 46, the drive mechanism 28 may include one first switching portion 57 and the branched first coupling path 59. The branched first coupling path 59 may couple one first switching portion 57 to the plurality of first air chambers 46.

When the liquid discharge apparatus 11 includes the plurality of second air chambers 51, the drive mechanism 28 may include one second switching portion 58 and the branched second coupling path 60. The branched second coupling path 60 may couple one second switching portion 58 to the plurality of second air chambers 51.

The carriage 14 may be of a line type in which the liquid discharge head 15 is disposed and fixed on the transport path of the medium 19. —All or at least one of the first storage portion 38, the second storage portion 50, the first air chamber 46, and the second air chamber 51 may be provided separately from the carriage 14.

The deaerating mechanism 27 may be provided in the supply path 22 upstream of the first storage portion 38 in the supply direction Ds. The second storage portion 50 may store the liquid to be pressurized and supplied. The deaerating mechanism 27 does not have to include the second air chamber 51. That is, the deaerating mechanism 27 may discharge bubbles in the second storage portion 50 through the transmissive portion 52 by the differential pressure between the pressure in the second storage portion 50 and the atmospheric pressure.

The entire transmissive portion 52 may be rigid. The transmissive portion 52 may have a portion that is flexible and other portions that are rigid. —The liquid discharge apparatus 11 does not have to include the second switching portion 58 and the second coupling path 60. The air suction path 55 or the air exhaust path 56 may be directly coupled to the second air chamber 51.

The air suction path 55 and the air exhaust path 56 do not have to be coupled to the second air chamber 51. —The first pressure regulator 61 and the second pressure regulator 62 may be a tank that stores air. The first pressure regulator 61 and the second pressure regulator 62 may regulate the pressure of the air suction path 55 and the air exhaust path 56 by changing the volume of a space for storing air.

The liquid discharge apparatus 11 does not have to include at least one of the first pressure regulator 61 and the second pressure regulator 62. The controller 16 may control the driving of the pump 54 based on the detection results of the detector 63 so that the pressure in the air suction path 55 becomes a predetermined negative pressure. The controller 16 may control the driving of the pump 54 based on the detection results of the detector 63 so that the pressure in the air exhaust path 56 becomes a predetermined positive pressure.

The entire first air chamber 46 may be formed of a hard material. For example, the first air chamber 46 may be formed by a cylinder with a piston that is displaced by the internal pressure. —The liquid discharge apparatus 11 may be a liquid discharge apparatus that ejects and discharges a liquid other than ink. The state of a liquid that is discharged from the liquid discharge apparatus as a very small amount of droplets includes a granule state, a tear-like state, and a tailing filiform state. The liquid here may be a material that can be discharged from the liquid discharge apparatus. For example, the liquid may be a material in a liquid state and includes a liquid state having a high or low viscosity, a sol, a gel water, other fluid states such as inorganic solvents, organic solvents, solutions, liquid resins, liquid metals, and metal solutions. The liquid includes a material where particles of a functional material formed of a solid material such as pigments or metal particles are dissolved into a solvent, dispersed, or mixed as well as a liquid as a one-state material. As a representative example of the liquid, there may be an ink described in the above embodiment or a liquid crystal. Herein, the ink may include general water-based ink and oil-based ink and various liquid compounds such as a gel ink and a hot-melt ink. Specific examples of the liquid discharge apparatus include liquid discharge apparatuses that discharge liquids that contain materials such as electrode materials, or coloring matter in dispersed or dissolved form, used for manufacturing, for example, liquid crystal displays, electroluminescence displays, surface emitting displays, color filters, and the like. The liquid discharge apparatus may be a liquid discharge apparatus that discharges bioorganic compounds for use in biochip manufacturing, a liquid discharge apparatus that discharges a specimen liquid for use as a precision pipette, a textile printing device, a microdispenser, and the like. The liquid discharge apparatus may be an apparatus that performs pinpoint discharge of a lubricant into a precision instrument such as a clock or camera, and a liquid discharge apparatus that discharges a solution of a transparent resin such as an ultraviolet-curing resin and the like onto a substrate for the purpose of forming a very small semi-spherical lens, an optical lens, and the like for use in an optical communication element or the like. The liquid discharge apparatus may be an apparatus that discharges an etchant solution such as acid or alkali for etching a substrate.

Definition

The phrase "at least one" used in the specification means "one or more" of desired options. As an example, the phrase "at least one" used in the specification means "only one option" or "both of the two options" when there are two options. As another example, the phrase "at least one" used in the specification means "only one option" or "a combination of appropriate two or more options" when the number of the options is three or more.

APPENDIX

Technical ideas that can be derived from the foregoing embodiment and modifications and their functions and effects will be described below.

(A) A liquid discharge apparatus includes a liquid discharge head that is configured to discharge a liquid from a nozzle, a supply path that supplies the liquid from a liquid supply source accommodating the liquid to the liquid discharge head, a pump that is configured to suck and exhaust air, an air suction path that is in communication with an air suction side of the pump, an air exhaust path that is in communication with an air exhaust side of the pump, a first storage portion that is provided in the supply path and has a portion formed of a flexible wall that is flexible, a first air chamber that is provided on a side opposite to the first storage portion across the flexible wall and in which at least a portion facing the flexible wall is configured to be displaced, and a first switching portion that is configured to switch a path coupled to the first air chamber between the air suction path and the air exhaust path, and the flexible wall is displaced by displacement of the first air chamber caused by air suction from the first air chamber to which the air suction path is coupled and air exhaust to the first air chamber to which the air exhaust path is coupled.

According to the configuration, the first switching portion couples the air suction path or the air exhaust path to the first air chamber. The air exhausted by the pump flows into the first air chamber to which the air exhaust path is coupled. The air is sucked out from the first air chamber to which the air suction path is coupled as the pump sucks air. Therefore, insufficient release of pressurization of the first air chamber can be suppressed.

(B) In the liquid discharge apparatus, the first air chamber may have at least one portion formed of a flexible member that is flexible and be configured to come into contact with the flexible wall, and the flexible wall may be displaced by displacement of the flexible member through air suction from the first air chamber and air exhaust to the first air chamber.

According to the configuration, the flexible member can come into contact with the flexible wall. The displaced flexible member comes into contact with the flexible wall so as to displace the flexible wall. Therefore, compared to a case where the flexible wall is directly pressurized or depressurized, damage received by the flexible wall can be reduced.

(C) The liquid discharge apparatus may further include a first pressure regulator that is provided in the air suction path and configured to maintain pressure in the air suction path at a predetermined negative pressure, and a second pressure regulator that is provided in the air exhaust path and configured to maintain pressure in the air exhaust path at a predetermined positive pressure.

According to the configuration, by providing the first pressure regulator in the air suction path, the pressure in the air suction path can be easily maintained at a suitable pressure. By providing the second pressure regulator in the air exhaust path, the pressure in the air exhaust path can be easily maintained at a suitable pressure.

(D) The liquid discharge apparatus may further include a second storage portion that is provided in the supply path and has a portion formed of a transmissive portion having gas transmissivity, and a second air chamber that is provided on a side opposite to the second storage portion across the transmissive portion, and the air suction path may be configured to be coupled to the second air chamber.

According to the configuration, the air suction path can be coupled to the second air chamber. Therefore, the pump can depressurize the inside of the second air chamber by sucking the air in the second air chamber. The second air chamber is partitioned from the second storage portion by the transmissive portion having gas transmissivity. Therefore, by depressurizing the inside of the second air chamber, bubbles in the second storage portion can be moved to the second air chamber.

(E) The liquid discharge apparatus may further comprise a second switching portion that is configured to switch a path coupled to the second air chamber between the air suction path and the air exhaust path, and at least a part of the transmissive portion may be flexible.

According to the configuration, the second switching portion couples the air suction path or the air exhaust path to the second air chamber. The pump pressurizes the second air chamber by causing the exhausted air to flow into the second air chamber to which the air exhaust path is coupled. Since at least a part of the transmissive portion is flexible, the transmissive portion is displaced in a direction in which the volume of the second air chamber is increased as the second air chamber is pressurized. In other words, the transmissive portion is displaced in a direction in which the volume of the second storage portion is reduced. Therefore, for example, when the second storage portion is filled with the liquid, the second air chamber is pressurized so that the air is unlikely to remain in the second storage portion.

(F) The liquid discharge apparatus may further include a carriage that is mounted with the liquid discharge head and configured to move in a scanning direction, and the first storage portion and the first air chamber may be provided on the carriage.

According to the configuration, the first storage portion and the first air chamber are provided on the carriage mounted with the liquid discharge head. Therefore, the first storage portion and the first air chamber can be provided at positions near the liquid discharge head.

(G) The liquid discharge apparatus may further include a carriage that is mounted with the liquid discharge head and configured to move in a scanning direction, and the first storage portion, the second storage portion, the first air chamber, and the second air chamber may be provided on the carriage.

According to the configuration, the first storage portion, the second storage portion, the first air chamber, and the second air chamber are provided on the carriage. Therefore, the first storage portion, the second storage portion, the first air chamber, and the second air chamber may be provided at positions near the liquid discharge head.

(H) A method for controlling a liquid discharge apparatus is a method for controlling the liquid discharge apparatus including a liquid discharge head that is configured to discharge a liquid from a nozzle, a supply path that supplies the liquid from a liquid supply source accommodating the liquid to the liquid discharge head, a pump that is configured to suck and exhaust air, an air suction path that is in communication with an air suction side of the pump, an air exhaust path that is in communication with an air exhaust side of the pump, a first storage portion that is provided in the supply path and has a portion formed of a flexible wall that is flexible, a first air chamber that is provided on a side opposite to the first storage portion across the flexible wall and in which at least a portion facing the flexible wall is configured to be displaced, and a first switching portion that is configured to switch a path coupled to the first air chamber between the air suction path and the air exhaust path, in which the flexible wall is displaced by displacement of the first air chamber caused by air suction from the first air chamber to which the air suction path is coupled and air exhaust to the first air chamber to which the air exhaust path is coupled, the method including coupling the air exhaust path to the first air chamber by the first switching portion, discharging the liquid from the nozzle by displacing the flexible wall in a direction in which a volume of the first storage portion is reduced by exhausting air to the first air chamber to pressurize an inside of the first air chamber, coupling the air suction path to the first air chamber while releasing coupling of the air exhaust path to the first air chamber by the first switching portion, and depressurizing the inside of the first air chamber by sucking air from the first air chamber.

According to the method, the same effects as those of the above liquid discharge apparatus can be exhibited. (I) The method for controlling the liquid discharge apparatus is the method for controlling the liquid discharge apparatus further including a second storage portion that is provided in the supply path and has a portion formed of a transmissive portion having gas transmissivity, a second air chamber that is provided on a side opposite to the second storage portion across the transmissive portion, and a second switching portion that is configured to switch a path coupled to the second air chamber between the air suction path and the air exhaust path, in which at least a part of the transmissive portion is flexible, and the method may further include coupling the air exhaust path to the second air chamber by the second switching portion, displacing a flexible portion of the transmissive portion in a direction in which a volume of the second storage portion is reduced by exhausting air to the second air chamber to pressurize an inside of the second air chamber, filling the supply path with the liquid, coupling the air suction path to the second air chamber while releasing coupling of the air exhaust path to the second air chamber by the second switching portion, and depressurizing an inside of the second air chamber by sucking air from the second air chamber.

According to the method, the same effects as those of the above liquid discharge apparatus can be exhibited.

What is claimed is:

1. A liquid discharge apparatus comprising:

a liquid discharge head that is configured to discharge a liquid from a nozzle;

a supply path that supplies the liquid from a liquid supply source accommodating the liquid to the liquid discharge head;

a pump that is configured to suck and exhaust air;

an air suction path that is in communication with an air suction side of the pump;

an air exhaust path that is in communication with an air exhaust side of the pump;

a first storage portion that is provided in the supply path and has a portion formed of a flexible wall that is flexible;

a first air chamber that is provided on a side opposite to the first storage portion across the flexible wall and in which at least a portion facing the flexible wall is configured to be displaced; and a first switching portion that is configured to switch a path coupled to the first air chamber between the air suction path and the air exhaust path, wherein the flexible wall is displaced by displacement of the first air chamber caused by air suction from the first air chamber to which the air suction path is coupled and air exhaust to the first air chamber to which the air exhaust path is coupled.

2. The liquid discharge apparatus according to claim 1, wherein the first air chamber has at least one portion formed of a flexible member that is flexible and is configured to come into contact with the flexible wall, and the flexible wall is displaced by displacement of the flexible member through air suction from the first air chamber and air exhaust to the first air chamber.

3. The liquid discharge apparatus according to claim 1, further comprising:

a first pressure regulator that is provided in the air suction path and configured to maintain pressure in the air suction path at a predetermined negative pressure; and a second pressure regulator that is provided in the air exhaust path and configured to maintain pressure in the air exhaust path at a predetermined positive pressure.

4. The liquid discharge apparatus according to claim 1, further comprising:

a second storage portion that is provided in the supply path and has a portion formed of a transmissive portion having gas transmissivity; and a second air chamber that is provided on a side opposite to the second storage portion across the transmissive portion, wherein the air suction path is configured to be coupled to the second air chamber.

5. The liquid discharge apparatus according to claim 4, further comprising a second switching portion that is configured to switch a path coupled to the second air chamber between the air suction path and the air exhaust path, wherein at least a part of the transmissive portion is flexible.

6. The liquid discharge apparatus according to claim 1, further comprising a carriage that is mounted with the liquid discharge head and configured to move in a scanning direction, wherein the first storage portion and the first air chamber are provided on the carriage.

7. The liquid discharge apparatus according to claim 4, further comprising a carriage that is mounted with the liquid discharge head and configured to move in a scanning direction, wherein the first storage portion, the second storage portion, the first air chamber, and the second air chamber are provided on the carriage.

8. A method for controlling a liquid discharge apparatus, the liquid discharge apparatus including a liquid discharge head that is configured to discharge a liquid from a nozzle, a supply path that supplies the liquid from a liquid supply source accommodating the liquid to the liquid discharge head, a pump that is configured to suck and exhaust air, an air suction path that is in communication with an air suction side of the pump, an air exhaust path that is in communication with an air exhaust side of the pump, a first storage portion that is provided in the supply path and has a portion formed of a flexible wall that is flexible, a first air chamber that is provided on a side opposite to the first storage portion across the flexible wall and in which at least a portion facing the flexible wall is configured to be displaced, and a first switching portion that is configured to switch a path coupled to the first air chamber between the air suction path and the air exhaust path, in which the flexible wall is displaced by displacement of the first air chamber caused by air suction from the first air chamber to which the air suction path is coupled and air exhaust to the first air chamber to which the air exhaust path is coupled, the method comprising:

coupling the air exhaust path to the first air chamber by the first switching portion;

discharging the liquid from the nozzle by displacing the flexible wall in a direction in which a volume of the first storage portion is reduced by exhausting air to the first air chamber to pressurize an inside of the first air chamber;

coupling the air suction path to the first air chamber while releasing coupling of the air exhaust path to the first air chamber by the first switching portion; and depressurizing the inside of the first air chamber by sucking air from the first air chamber.

9. The method for controlling the liquid discharge apparatus according to claim 8, the liquid discharge apparatus further including a second storage portion that is provided in the supply path and has a portion formed of a transmissive portion having gas transmissivity, a second air chamber that is provided on a side opposite to the second storage portion across the transmissive portion, and a second switching portion that is configured to switch a path coupled to the second air chamber between the air suction path and the air exhaust path, in which at least a part of the transmissive portion is flexible, the method further comprising:

coupling the air exhaust path to the second air chamber by the second switching portion;

displacing a flexible portion of the transmissive portion in a direction in which a volume of the second storage portion is reduced by exhausting air to the second air chamber to pressurize an inside of the second air chamber;

filling the supply path with the liquid;

coupling the air suction path to the second air chamber while releasing coupling of the air exhaust path to the second air chamber by the second switching portion; and depressurizing the inside of the second air chamber by sucking air from the second air chamber.

* * * * *